United States Patent
Srinivasan et al.

(10) Patent No.: US 7,574,516 B2
(45) Date of Patent: Aug. 11, 2009

(54) MECHANISMS FOR TRANSFERRING RAW DATA FROM ONE DATA STRUCTURE TO ANOTHER REPRESENTING THE SAME ITEM

(75) Inventors: Sowmyanarayanan K. Srinivasan, Redmond, WA (US); Natasha H. Jethanandani, Seattle, WA (US); Stefan H. Pharies, Seattle, WA (US); Douglas M. Purdy, Carnation, WA (US); Donald F. Box, Bellevue, WA (US); Gopala Krishna R. Kakivaya, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 699 days.

(21) Appl. No.: 11/049,108

(22) Filed: Feb. 1, 2005

(65) Prior Publication Data

US 2006/0173933 A1 Aug. 3, 2006

(51) Int. Cl.
*G06F 15/16* (2006.01)
(52) U.S. Cl. .................. 709/232; 707/201; 707/203
(58) Field of Classification Search ................ 709/246, 709/232, 230; 719/319; 707/101, 100, 200, 707/204
See application file for complete search history.

(56) References Cited

U.S. PATENT DOCUMENTS

| 5,465,365 A * | 11/1995 | Winterbottom | 707/101 |
| 6,381,600 B1 | 4/2002 | Lau | 707/6 |
| 6,928,442 B2 * | 8/2005 | Farber et al. | 707/10 |
| 2004/0244012 A1 | 12/2004 | Massarenti | 719/319 |
| 2005/0097575 A1 * | 5/2005 | McCain et al. | 719/328 |
| 2006/0041566 A1 * | 2/2006 | Chen et al. | 707/100 |
| 2007/0299854 A1 * | 12/2007 | Bohlmann et al. | 707/100 |

FOREIGN PATENT DOCUMENTS

| WO | WO 99/52047 | 10/1999 |
| WO | WO 03/029955 | 4/2003 |

OTHER PUBLICATIONS

Lowy, Juval, *Advanced Serialization: Format Your Way to Success with the .NET Framework Version 1.1 and 2.0*, MSDN Magazine, Oct. 2004 Retrieved from the Internet: URL:http://msdn.microsoft.com/msdnmag/issues/04/10/AdvancedSerialization/.

(Continued)

*Primary Examiner*—William C Vaughn, Jr.
*Assistant Examiner*—Scott Christensen
(74) *Attorney, Agent, or Firm*—Workman Nydegger

(57) ABSTRACT

The transfer of raw data from a source data structure to a target data structure that represent the same item. During the data transfer, if there is a given field in the target data structure that does not correspond to a field supplied by the source data structure, the transfer mechanism determines whether or not it is mandatory that the source data structure supply the field. If it is mandatory, the transfer fails. Otherwise, the transfer continues. If there is field of the source data structure that does not correspond to a field of the target data structure, the transfer mechanism determines whether or not it is mandatory that the target data structure have the field. If it is mandatory, the transfer fails. Otherwise, the corresponding data may be provided to a residual field of the target data structure dedicated for unknown data.

14 Claims, 8 Drawing Sheets

OTHER PUBLICATIONS

W3C Architecture Domain ;*XML Schema*;C.M. Sperberg-McQueen and Henry Thompson, created Apr. 2000; http://www.w3.org/XLM/Schema; W3C Architecture Domain, pp. 1-24.

*Version Tolerant Serialization Technology Sample*; http://msdn2.microsoft.com/library/7a6c3wzt.aspx (VTS sample); © 2006 Microsoft Corporation.

*OptionalFieldAttribute Class*; http://msdn2.microsoft.com/library/7b62by8y.aspx (VTS sample); © 2006 Microsoft Corporation.

*OnSerializedAttribute Class*; http://msdn2.microsoft.com/library/hwh12kcw.aspx (VTS sample); © 2006 Microsoft Corporation.

\* cited by examiner

MECHANISMS FOR TRANSFERRING RAW DATA FROM ONE DATA STRUCTURE TO ANOTHER REPRESENTING THE SAME ITEM

BACKGROUND OF THE INVENTION

1. The Field of the Invention

The present invention relates to computing technology; and more specifically, to mechanisms for transferring raw data from one data structure to another data structure representing the same item.

2. Background and Related Art

Computing technology has transformed the way we work and play. Computing systems now take a wide variety of forms including desktop computers, laptop computers, tablet PCs, Personal Digital Assistants (PDAs), household devices and the like. The functionality of the computing system is directed by software. Software is a sequence of computer-executable instructions that, when executed, causes the computing system to perform the functionality.

Object-oriented programming has developed as a mechanism to organize the authoring of software using logical units called objects that interact with one another. An object comprises one or more data fields that are representative of properties of the object, and zero or more methods (or pointers to methods) that include computer-executable code that relate to behavior of the object. Objects may interact by calling a method that is exposed by another object. Such objects may also be referred to herein as "data objects" or "data structures".

When in-memory, the data structure is a collection of associated data fields and methods. However, it is often necessary to transfer the raw data from the data structure into another data structure representing the same item. This can be problematic if there is raw data for data fields in the source data structure that are not present in the target data structure, or if there is raw data for data fields in the target data structure that are not provided in the source data structure. In that case, the transfer would typically fail.

What would be advantageous are mechanisms for transferring raw data from one data structure to another even if not all of the fields that would ideally be transferred were included in both data structures.

BRIEF SUMMARY OF THE INVENTION

The foregoing problems with the prior state of the art are overcome by the principles of the present invention, which are directed towards transferring raw data from a source data structure to a target data structure. The data structure may each represent the same core item (e.g., a person), but may represent different versions of the data structure.

During the data transfer, if there is a given field in the target data structure that does not correspond to a field supplied by the source data structure, the transfer mechanism determines whether or not it is mandatory that the source data structure supply the field. The data contract corresponding to the field may, for example, specify an "optionality" field that specifies whether this is mandatory. If it is mandatory that the source data structure supply the field corresponding to the given field, the transfer fails. On the other hand, if it is not mandatory that the source data structure supply the field, the transfer is continued without the data.

Also, if there is a field of the source data structure that does not correspond to a field of the target data structure, the transfer mechanism determines whether or not it is mandatory that the target data structure have the field. The data field may itself specify a "must understand" field that specifies whether or not the target data structure must have a corresponding field. If it is mandatory that the target data structure have such a corresponding field, the transfer fails. On the other hand, if it is not mandatory that the target data structure have such a corresponding field, the data may be provided as unknown data into a residual field of the target data structure dedicated for unknown data.

Accordingly, by setting "optionality" and "must understand" fields for each field, the transfer may be accomplished across different versions of a data structure if desired, or version compatibility may be disabled, if appropriate. Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
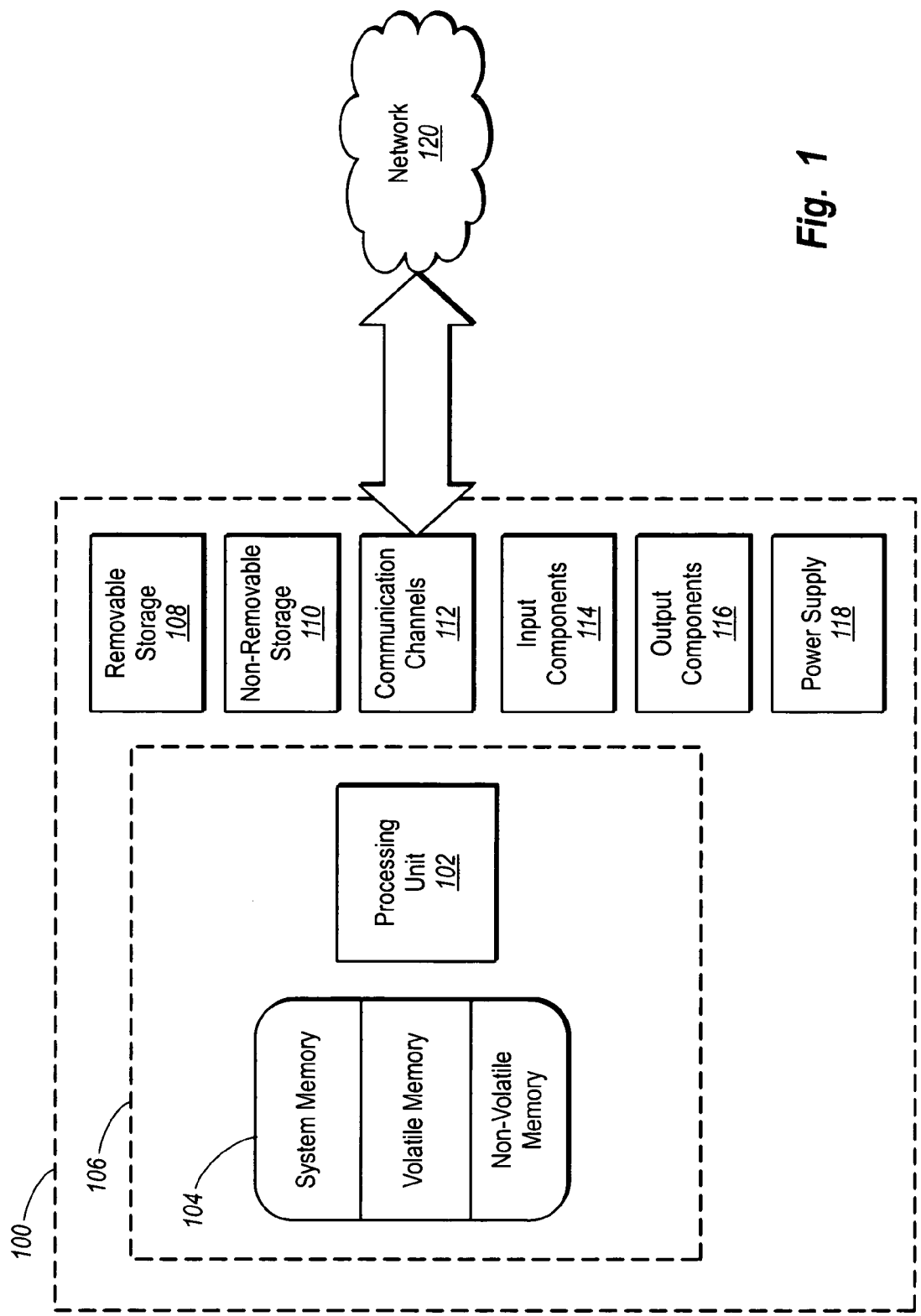
FIG. 1 illustrates a suitable computing system that may implement features of the present invention.

The principles of the present invention relate to the transfer of raw data from a source data structure to a target data structure that represents the item. The data structure may each represent the same core item, but may represent different versions of the data structure. During the data transfer, if there is a given field in the target data structure that does not correspond to a field supplied by the source data structure, the transfer mechanism determines whether or not it is mandatory that the source data structure supply the field. If it is mandatory, the transfer fails. Otherwise, the transfer continues. If there is a field of the source data structure that does not correspond to a field of the target data structure, the transfer mechanism determines whether or not it is mandatory that the target data structure have the field. If it is mandatory, the transfer fails. Otherwise, the corresponding data may be provided to a residual field of the target data structure dedicated for unknown data.

Turning to the drawings, wherein like reference numerals refer to like elements, the invention is illustrated as being implemented in a suitable computing environment. The following description is based on illustrated embodiments of the invention and should not be taken as limiting the invention with regard to alternative embodiments that are not explicitly described herein.

In the description that follows, the invention is described with reference to acts and symbolic representations of operations that are performed by one or more computers, unless indicated otherwise. As such, it will be understood that such acts and operations, which are at times referred to as being computer-executed, include the manipulation by the processing unit of the computer of electrical signals representing data in a structured form. This manipulation transforms the data or maintains them at locations in the memory system of the computer, which reconfigures or otherwise alters the operation of the computer in a manner well understood by those skilled in the art. The data structures where data are maintained are physical locations of the memory that have particular properties defined by the format of the data. However, while the invention is being described in the foregoing context, it is not meant to be limiting as those of skill in the art will appreciate that several of the acts and operations described hereinafter may also be implemented in hardware. FIG. 1 shows a schematic diagram of an example computer architecture usable for these devices.

For descriptive purposes, the architecture portrayed is only one example of a suitable environment and is not intended to suggest any limitation as to the scope of use or functionality of the invention. Neither should the computing systems be interpreted as having any dependency or requirement relating to anyone or combination of components illustrated in FIG. 1.

The invention is operational with numerous other general-purpose or special-purpose computing or communications environments or configurations. Examples of well known computing systems, environments, and configurations suitable for use with the invention include, but are not limited to, mobile telephones, pocket computers, personal computers, servers, multiprocessor systems, microprocessor-based systems, minicomputers, mainframe computers, and distributed computing environments that include any of the above systems or devices.

In its most basic configuration, a computing system 100 typically includes at least one processing unit 102 and memory 104. The memory 104 may be volatile (such as RAM), non-volatile (such as ROM, flash memory, etc.), or some combination of the two. This most basic configuration is illustrated in FIG. 1 by the dashed line 106.

The storage media devices may have additional features and functionality. For example, they may include additional storage (removable and non-removable) including, but not limited to, PCMCIA cards, magnetic and optical disks, and magnetic tape. Such additional storage is illustrated in FIG. 1 by removable storage 108 and non-removable storage 110. Computer-storage media include volatile and non-volatile, removable and non-removable media implemented in any method or technology for storage of information such as computer-readable instructions, data structures, program modules, or other data. Memory 104, removable storage 108, and non-removable storage 110 are all examples of computer-storage media. Computer-storage media include, but are not limited to, RAM, ROM, EEPROM, flash memory, other memory technology, CD-ROM, digital versatile disks, other optical storage, magnetic cassettes, magnetic tape, magnetic disk storage, other magnetic storage devices, and any other media that can be used to store the desired information and that can be accessed by the computing system.

As used herein, the term "module" or "component" can refer to software objects or routines that execute on the computing system. The different components, modules, engines, and services described herein may be implemented as objects or processes that execute on the computing system (e.g., as separate threads). While the system and methods described herein are preferably implemented in software, implementations in software and hardware or hardware are also possible and contemplated.

Computing system 100 may also contain communication channels 112 that allow the host to communicate with other systems and devices over network 120. Communication channels 112 are examples of communications media. Communications media typically embody computer-readable instructions, data structures, program modules, or other data in a modulated data signal such as a carrier wave or other transport mechanism and include any information-delivery media. By way of example, and not limitation, communications media include wired media, such as wired networks and direct-wired connections, and wireless media such as acoustic, radio, infrared, and other wireless media. The term computer-readable media as used herein includes both storage media and communications media.

The computing system 100 may also have input components 114 such as a keyboard, mouse, pen, a voice-input component, a touch-input device, and so forth. Output components 116 include screen displays, speakers, printer, etc., and rendering modules (often called "adapters" ) for driving them. The computing system 100 has a power supply 118. All these components are well known in the art and need not be discussed at length here.

Figure 2:
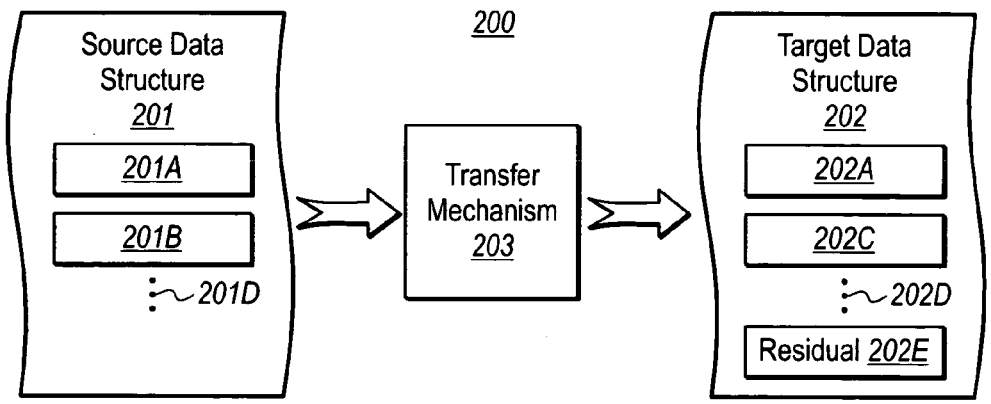
FIG. 2 illustrates the transfer of raw data from a source data structure to a target data structure using a transfer mechanism in accordance with the principles of the present invention.

FIG. 2 illustrates an environment 200 in which one or more fields from a source data structure 201 are being transferred to a target data structure 202 using transfer mechanism 203. The source data structure 201 and the target data structure 202 may represent the same item, but in different ways. For example, the data structures may each represent a particular person, organization, airline reservation, or any other conceivable object or entity that may have associated data. The source data structure 201 and the target data structure 202 may be embodied on any medium (even an intangible medium such as wireless communications), and may even be a serialized representation of yet another data structure, although this is not required.

Some of the data fields of the data structures may be the same. For example, as illustrated in FIG. 2, source data structure 201 includes data field 201A, which is to contain the same data as the data field 202A in the target data structure 202. For instance, suppose that the data structures each represent data associated with a particular person. The data field 201A of the source data structure 201 may represent the person's name, whereas the data field 202A is a name field that is to be populated by the transfer mechanism 203.

On the other hand, the source data structure 201 may have fields (e.g., field 201B) that are not present in the target data structure 202. For instance, there is no field 202B in target data structure 202. In a specific example, suppose that the field 201B represents a Boolean value representing whether or not the associated person is alive, whereas the target data structure 202 has no such field.

In one example implementation described further below, a "data contract" is used to describe what fields are to be included in the data structure when representing a particular entity (e.g., a person). The source data structure 201 and the target data structure 202 may follow different versions of a "person" data contract, in which the version followed by the source data structure 201 specifies that a field representing whether or not the person is alive is to be included in the data structure. In contrast, the version of the person data contract that is followed by the target data structure does not specify that a field representing whether or not the person is alive is to be included in the data structure. Different versions of a data contract may be developed as the need for different data fields for a particular entity changes over time.

Such data contracts will be described in general terms when describing the general principles of the present invention with respect to FIGS. 2, 3, 4, 5A and 5B, since the broadest principles of the present invention relate to the general transfer of data from a source data structure to a target data structure, regardless of whether the data structures follow a data contract. Nevertheless, for the sake of completeness, the concept of the data contract will be described in further detail in FIGS. 6 through 10.

As just mentioned, the source data structure 201 may contain different fields than the target data structure 202 since the data structures following different versions of a data contract. The different versions of the data contract may also cause the target data structure 202 to contain different fields than the source data structure 201. For instance, target data structure is illustrated as including data field 202C, whereas the source data structure does not contain a corresponding data field 201C. In the example of a person data contract, the data field 202C may represent a Social Security number, which is represented in the version of the person data contract followed by the target data structure 202, but is not represented in the version of the person data contract followed by the source data structure 201.

The source data structure 201 and target data structure 202 are shown as including one field (field 201A in source data structure 201, and field 202A in target data structure 202) that is in common between the data structures (hereinafter referred to a "common data field"). In addition, the source data structure 201 is illustrated as including a data field (e.g., data field 201 B) that is not included in the target data structure 202 (hereinafter referred to as a "source-exclusive data field"). Finally, the target data structure 202 is illustrated as including a data field (e.g., data field 202C) that is not included in the source data structure 201 (hereinafter referred to as a "target-exclusive data field").

However, the source data structure 201 may contain any number (zero or more) common data fields, and any number (zero or more) of source-exclusive data fields, as appropriate (e.g., given the differences in the data contract versions followed by each of the data structures 201 and 202). Furthermore, the target data structure 202 may contain any number (zero or more) common data fields, and any number (zero or more) of target-exclusive data fields, as appropriate (e.g., as dictated by the contact version differences). The vertical ellipses 201D and 202D are simply illustrated to show that the source and target data structures 201 and 202, respectively, may contain more data fields as appropriate. The target data structure 202 is also illustrated as including a residual field 202E. The purpose of this residual field 202E will be described in further detail with respect to FIG. 5A.

Figure 4:
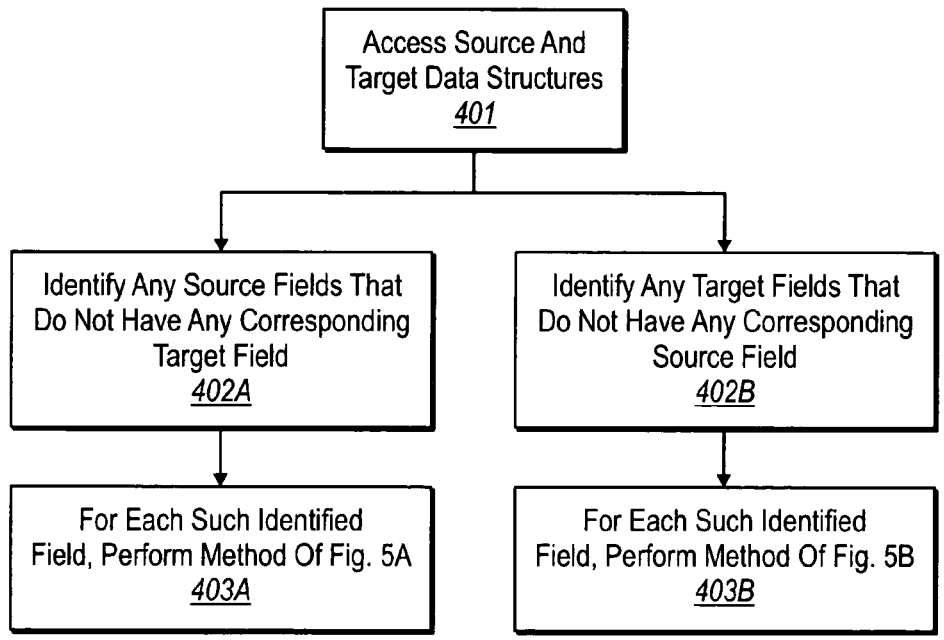
FIG. 4 illustrates a flowchart of a method for transferring raw data from a source data structure to a target data structure in accordance with the principles of the present invention.

FIG. 4 illustrates a flowchart of a computer-implemented method 400 for transferring data from a source data structure to a target data structure in accordance with the principles of the present invention. As part of the method 400, the source and target data structures are accessed (act 401 ). The term "data structure" is defined broadly herein to include any structured data (even serialized data) that includes one or more fields, regardless of the medium upon which the data structure is embodied. For example, the computing system may access the source data structure over a network, in which case the method 400 is performed on a target computing system. If, for example, the target computing system is the computing system 100 of FIG. 1, the target computing system may access the source data structure over network 120. However, the computing system may access the source data structure from other data store mediums as well such as, for example, volatile, or non-volatile memory. In the case of FIG. 1, the target data structure may be accessed from system memory 104 and/or storage 108 or 110.

For any common data fields, the computing system simply copies the data from the source field into the corresponding target field. Of course, copying may involve some converting of encoding format. The computing system also identifies any source-exclusive data fields in the source data structure that are not included in the target data structure (act 402 A). For any such source-exclusive fields, the computing system performs the method 500A of FIG. 5A (act 403A in conjunction with FIG. 5A). The computing system also identifies any target-exclusive data fields in the target data structure that are not included in the source data structure (act 402B). For any such target-exclusive fields, the computing system performs the method 500B of FIG. 5B (act 403B in conjunction with FIG. 5B).

Figure 5A:
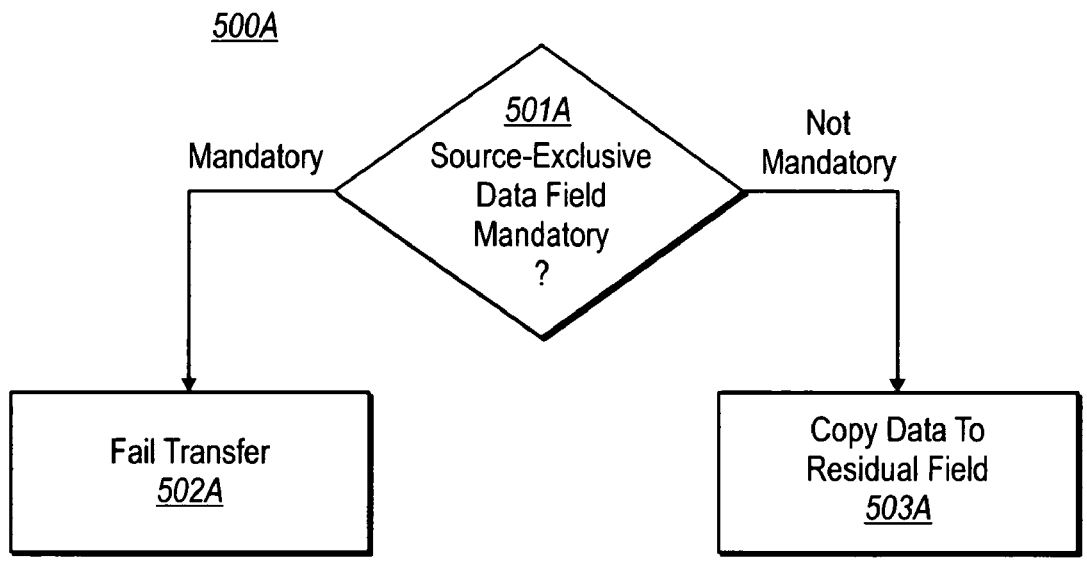
FIG. 5A illustrates a flowchart of a method for handling a source field depending on whether or not an associated target field is required.

Referring to the method 500A of FIG. 5A, for any identified source-exclusive data field, the computing system determines whether or not it is mandatory that the target data structure have a field corresponding to the source-exclusive data field in the target data structure in order for the transfer to be successful (decision block 501A). If it is mandatory (Mandatory in decision block 501A), then the computing system fails the transfer (act 502A). If it is not mandatory (Not Mandatory in decision block 501A), the computing system provides the data from the source-exclusive data field into a residual field (act 503A). The residual field (e.g., residual field 202E of FIG. 2) is a logical container that holds all of the data from the source data structure that was not understood by the target data structure. The data in the residual field may be tagged so that the field type from which each of the data was extracted may be later identified. The data in the residual field may be retransferred if the data structure is resent to yet another target data structure, thereby preserving data from a previous version of the data contract.

Figure 3:
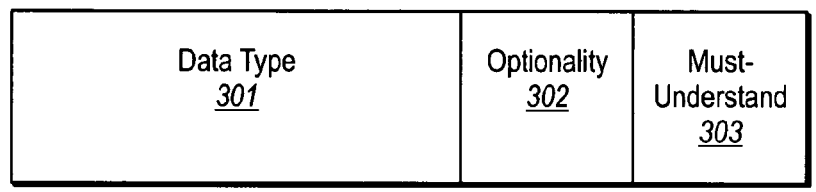
FIG. 3 schematically illustrates a data field template including an identification of the data field type, an optionality field, and a "must understand" field.

FIG. 3 illustrates a data field template 300 that may be used as part of a data contract to define a data field type 301 (e.g., name in the case of a person data contract), an optionality field 302 that defines whether or not the source data structure must have a particular field included in the target data structure in order for the transfer to be successful, and a must-understand field 303 that defines whether or not the target data structure must have a particular field included in the source data structure in order for the transfer to be successful. When a source data structure is transmitted or stored is that includes a data field of the same data type as defined by the template 300, the raw data associated with the data type 301 is transmitted or stored along with the associated must-understand indication 303 defined by the template. Accordingly, whether or not the source-exclusive data field is mandatory may be understood from the must-understand field associated with the source-exclusive data field itself.

Figure 5B:
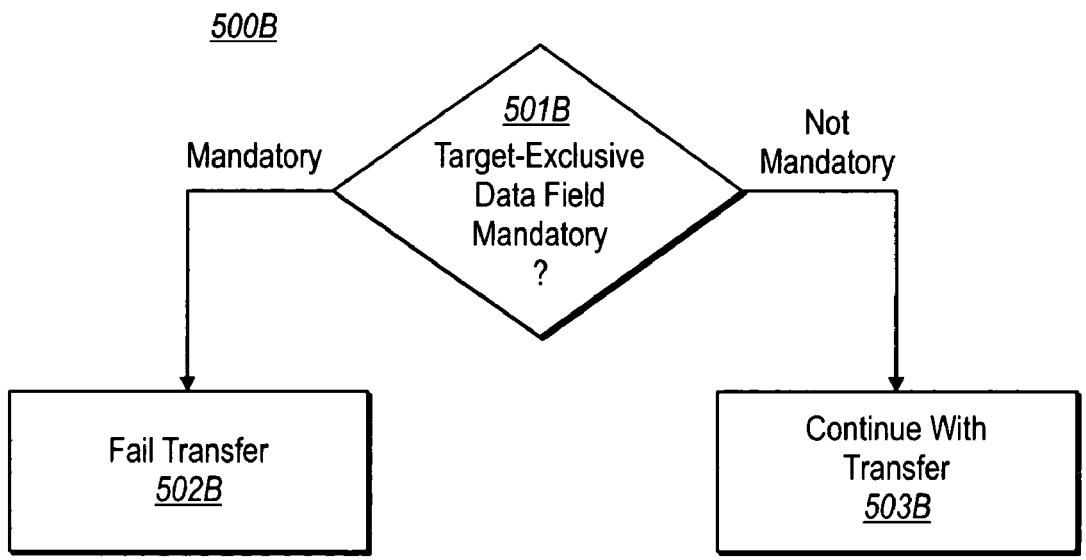
FIG. 5B illustrates a flowchart of a method for handling a target field depending on whether or not an associated source field is required.

Referring to the method 500B of FIG. 5B, for any identified target-exclusive data field, the computing system determines whether or not it is mandatory that the source data structure supply a field corresponding to the target-exclusive field in order for the transfer to be successful (decision block 501B).

If it is mandatory (Mandatory in decision block 501B), then the computing system fails the transfer (act 502B). If it is not mandatory (Not Mandatory in decision block 501B), then the computing system continues with the transfer (act 503B). For example, the computing system evaluates the next field, or if all of the source and target fields have been evaluated, successfully completes the entire transfer.

Whether or not the target-exclusive data field is mandatory may be understood from metadata associated with the target-exclusive data field itself. For example, suppose the target-exclusive data field is structured as illustrated for the data field 300 of FIG. 3. The target-exclusive data field (or a structure (e.g., a data contract) associated with the target-exclusive data field) may include an optionality field 302, which may be a Boolean expression for whether or not the source data structure must supply an associated field. The determination in decision block 501B may be made based on the optionality field 302.

Having described the general principles of the present invention, a specific embodiment of the present invention will now be described with respect to FIGS. 6 through 10 in which data contacts are used to define the form of a data structure during serialization and deserialization.

Figure 6:
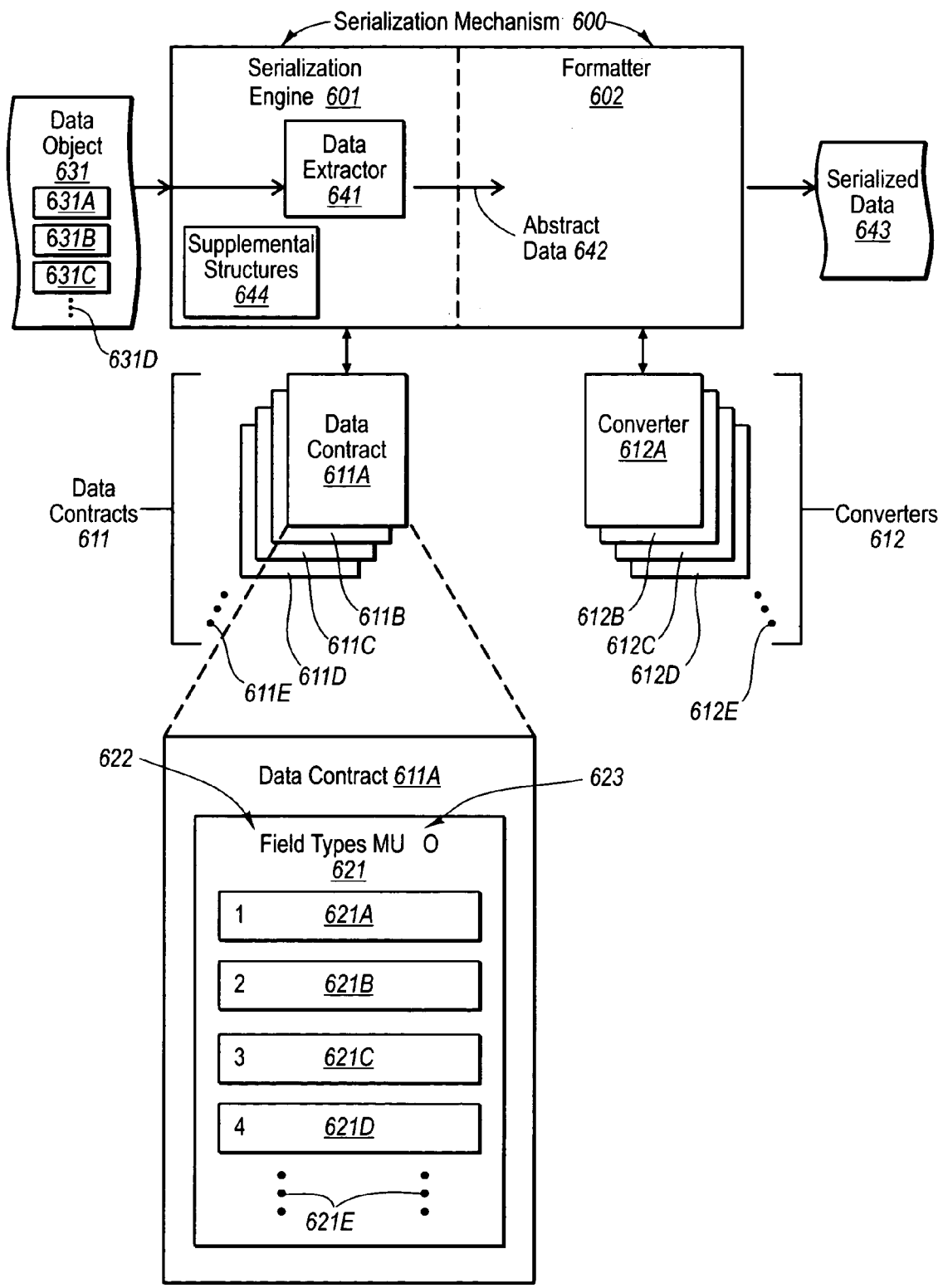
FIG. 6 schematically illustrates a process of serialization using a serialization mechanism in accordance with the principles of the present invention.

FIG. 6 schematically illustrates a process of serialization using a serialization mechanism. The serialization mechanism 600 includes a serialization engine 601 and a formatter 602. The serialization engine 601 and formatter 602 may be integrated within the same routine or may be implemented by separate routines without affecting the principles of the present invention. The serialization engine 601 and the formatter 602 may be components executed within the environment of the computing system 100 of FIG. 1. However, the principles of the present invention are independent of and not limited to any particular hardware environment. The remaining structure shown in FIG. 6 will be described with respect to FIG. 7, which illustrates a flowchart of a method of serializing in accordance with the principles of the present invention.

In this embodiment, the data object is serialized by merely serializing abstract data extracted from the data object, rather than serializing the structure surrounding the abstract data. Accordingly, entities accessing the serialized data need not understand the structure of the data object from which the data was extracted. Also, the serialization does not disclose perhaps sensitive information regarding the form of the data object.

Figure 7:
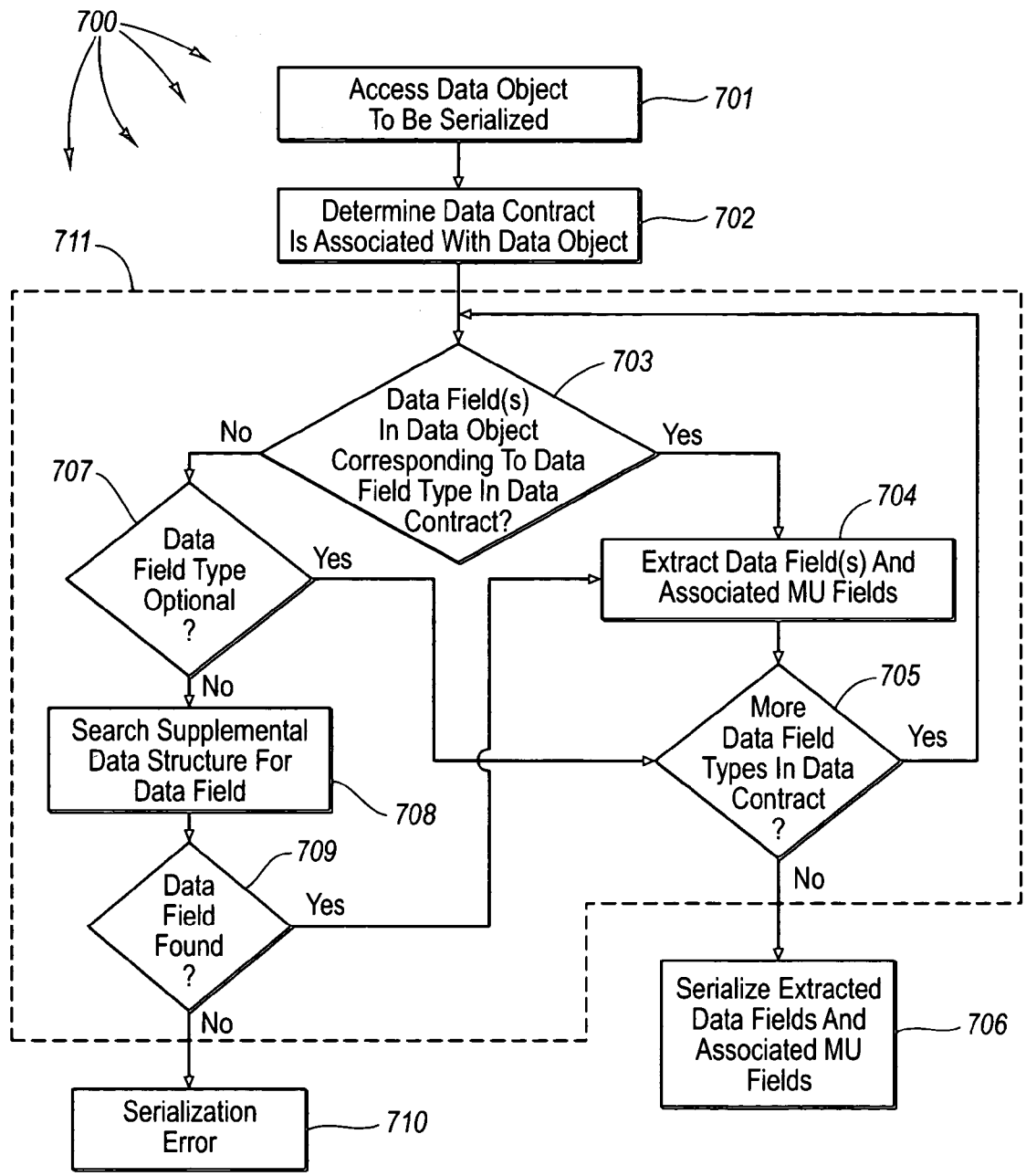
FIG. 7 illustrates a flowchart of a method of serializing in accordance with the principles of the present invention.

Referring to FIG. 7, a data object to be subjected to serialization is accessed (act 701). For instance, the serialization engine 601 in FIG. 6 may access the data object 631. The data object 631 may be any data object type. For purposes of illustration, the data object 631 is illustrated as including data fields 631A through 631C amongst potentially others as represented by the vertical ellipses 631D.

It is then determined that the data object is associated with a "data contract" (act 702). In this description and in the claims, a "data contract" is defined as an identification of one or more data field types that correspond to data fields that are to be serialized.

For instance, the serialization engine 601 has access to a collection of data contracts 611 that may include any number of data contracts. As illustrated, the data contracts 611 include data contracts 611A through 611D amongst potentially many others as represented by the ellipses 611E. The data contract may correspond to a particular logical entity type. For example, data contract 611A may correspond to a person data type. There is no limit, however, to the types of data objects that may have a corresponding data contract.

FIG. 6 shows data contract 611A in exploded view as including a number of data field types 611. Each data field type may include a data field type identification 622 as well as one or more other designators 623 relating to the data type.

For example, suppose that the data contract 611A corresponded generally to people data objects. The data field type 621A may be, for example, a name data type, data field type 621B may be an age data type, data field type 621C may be a gender data type, data field type 621D may be an address data type, and so forth. Shown designators include "MU" for "must understand" and O for "optionality" as previously described. The designators may also include a "RT" designator indicating whether or not data that is not understood by the target should be placed in the residual field (e.g., residual field 202E of FIG. 2).

Returning back to FIG. 7, it is then determined whether or not the data object has a data field corresponding to a data field type identified in the data contract (decision block 703). For instance, suppose the serialization engine 601 of FIG. 6 has identified data contract 611A as being associated with the accessed data object 631. The serialization engine 601 would evaluate data field type 621A to determine if there are any associated data fields amongst any of the data fields 631A through 631D of the data object 631 that correspond to that data field type 621A. For example, suppose that the data field type 631A is a name data type. The serialization engine 601 would evaluate all of the data fields of data object 631 to determine if there is a "name" field.

If it is determined that the data object does have a data field corresponding to the data field type (Yes in decision block 703), then the corresponding data is extracted from the data object (act 704). For example, the data extractor component 641 may extract the appropriate data field(s) (e.g., specific name or names) corresponding to the data field type (e.g., name data type) from the data object. As part of this extraction process, the associated must-understand field for each of the extracted data fields are also extracted.

If there are no more data field types specified in the data contract (No in decision block 705), then any extracted data fields (and their associated must-understand fields) are serialized (act 706). Alternatively, a data field may be serialized immediately after being extracted. For instance, the serialization (act 706) may occur immediately after extraction (act 704), rather than waiting until all data fields have been extracted (No in decision block 705). The extracted data is represented by abstract data 642 in FIG. 6. This data is independent of the data object and includes only the extracted data, not the entire data object. The formatter 602 then determines what serialization format to serialize into, and selects from a library of converters 612 an appropriate converter corresponding to that serialization format. For example, the library of converters 612 is illustrated as including corresponding converters 612A, 612B, 612C, 612D, amongst others as represented by the ellipses 612E. Examples of serialization formats include, for example, binary, eXtenstible Markup Language (XML), amongst any other serialization formats, whether conventional, or whether not yet existing. The formatter 602 then uses the appropriate converter component (e.g., converter component 612A) to serialize the abstract data 642 into the appropriate serialization format.

Returning to FIG. 7, if there are yet more data field types in the data contract to evaluate (Yes in decision block 705), then flow proceeds back to decision block 703, where it is determined for the next data field type in the data contract, whether there are any data fields in the data object corresponding to that data field type (act 303), and the process repeats.

If at any point, there are no data fields in the data object corresponding to a data field type found in the data contract (No in decision block 703), it is then determined whether the data field type is mandatory or optional (decision block 707). This determination may be made by referring to the designators 623 in the corresponding data field type in the data contract.

If the data field type is optional (Yes in decision block 707), then flow proceeds back to decision block 705, where serialization is performed (act 706) if there are not any more data field types in the data contract to evaluate, or where the next data field type is evaluated (decision block 703) if there are more data field types to evaluate.

If, on the other hand, the data field type is not optional from the sender side point of view mandatory (No in decision block 707), then a supplemental data structure corresponding to the data object may be searched (act 708) for the presence of an associated data field. For example, the serialization engine 601 of FIG. 6 may search a supplemental data structure 644 associated with the data object 631 for the presence of a data field that corresponds to the current data field type in the data contract. If such a data field is found in the supplemental data structure (Yes in decision block 709), then that data field is extracted (act 704) and added to the collection of abstract data. If such a data field is not found in the supplemental data structure (No in decision block 709), then the serialization engine 601 indicates that the serialization has failed (act 710). Of course, the serialization error of act 710 may never occur if the serialization mechanism guarantees that the data field is always found in the supplemental data structure. An example of such a supplemental data structure is the residual field 202E of FIG. 2. The object to be sent may have placed unknown data in that residual field 202E when it previously failed to recognize data to be received into the object during a prior data transfer attempt. Alternatively, the serialization process could simply serialize all data fields, regardless of their optionality status, and leave the formal evaluation of whether or not the transfer will fail to the receive end.

Optionally, the supplemental data structure 644 may also be searched if the data field type is determined to be optional (Optional in decision block 707). In that case, if a corresponding data field is not found in the supplemental data structure, then the flow simply proceeds to decision block 705, where it is determined whether or not there are more data field types in the data contract to be evaluated.

The dashed box 711 in FIG. 7 represents an evaluation process for each data type to be evaluated from the data contract. The process may be repeated until either a mandatory data field type having no corresponding data field is encountered (No in decision block 709), or until all of the data field types have been evaluated (No in decision block 705).

Accordingly, the method 700 operates to extract abstract data from a data object corresponding to a data contract, where the nature of the abstract data is defined by the data contract, and operates to serialize such abstract data in a manner that is independent of the data object format. The method 700 may be repeated for many data objects, regardless of whether or not different data contracts are associated with those other data objects, and regardless of the serialization format to be used. Such abstract data may also include information on whether a given field must be understood by the target in order for the transfer to be successful. Such abstract data is an example of the source data structure described above with respect to FIGS. 2, 3, 4, 5A and 5B.

Before proceeding to a description of deserialization, a specific example of a data object will be described along with a specific indication of how a data contract is associated with that data object, and how corresponding data fields may be identified in the data object. The following is C sharp source code for an example data object with line numbering added for clarity:

```
1.    namespace SomeOtherNamespace {
2.        [DataContract(Namespace="Example", Name="Person")]
3.        public class AnotherPersonThatSomeOneElseCreated {
4.            [DataMember("_name")]
5.            public string FullNameOfThisPerson;
6.        }
7.    }
```

The data contract associated with the data object may be identified by the combination of the namespace and name of the data contract. Line 2 represents metadata that includes all of the information needed to identify the data contract. Specifically, the namespace of the data contract is "Example". The name of the data contract is "Person". Thus, the data contract is identified.

The data object is of the class "AnotherPersonThatSomeOneElseCreated" (see line 3) which includes only one data field (see line 5). The data field is a string having the name "FullNameOfThisPerson". However, the preceding line (line 4) indicates that this string data field should be considered as being of type "_name" for purposes of evaluating the data contract. Accordingly, when the data field type "string_name" is evaluated, it may be construed that the string "FullNameOfThisPerson" corresponds to that data field type. That string may then be extracted as the abstract data to be serialized.

The following illustrates another example data object:

```
1.    namespace Example {
2.        [DataContract]
3.        class Person {
4.            [DataMember]
5.            private string _name;
6.        }
7.    }
```

In this example, the name of the namespace for the data object and the data contract are the same being "Example". Accordingly, there is no need for further designation of the data contract namespace in line 2. Furthermore, the name of the data contract and the name of the data object are the same being "Person". Accordingly, there is no need for further designation of the data contract name in line 2. Lastly, the name of the data field specified in the data object and the data field type is the same being "string—name". Therefore, there is no further need to designate the data field type in line 4.

Figure 8:
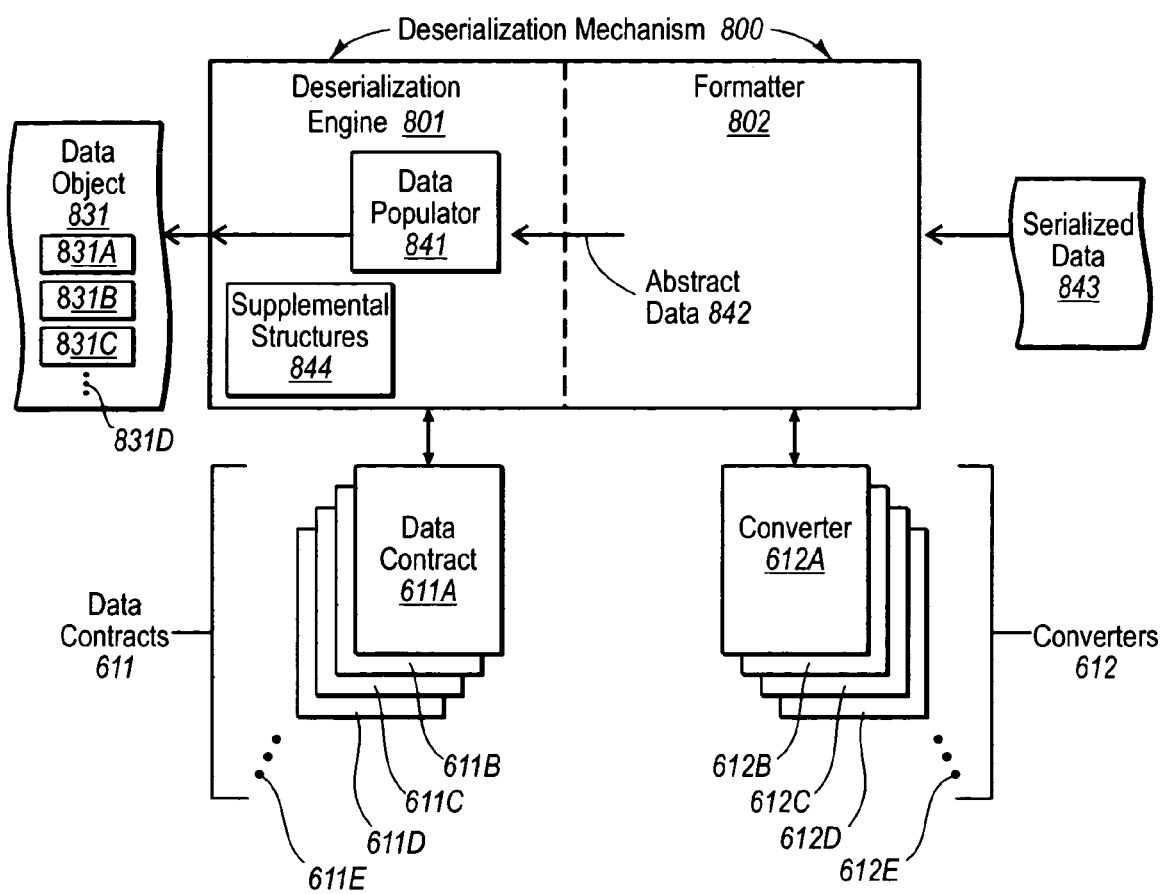
FIG. 8 schematically illustrates a process of deserialization using a deserialization mechanism in accordance with the principles of the present invention.
Figure 9:
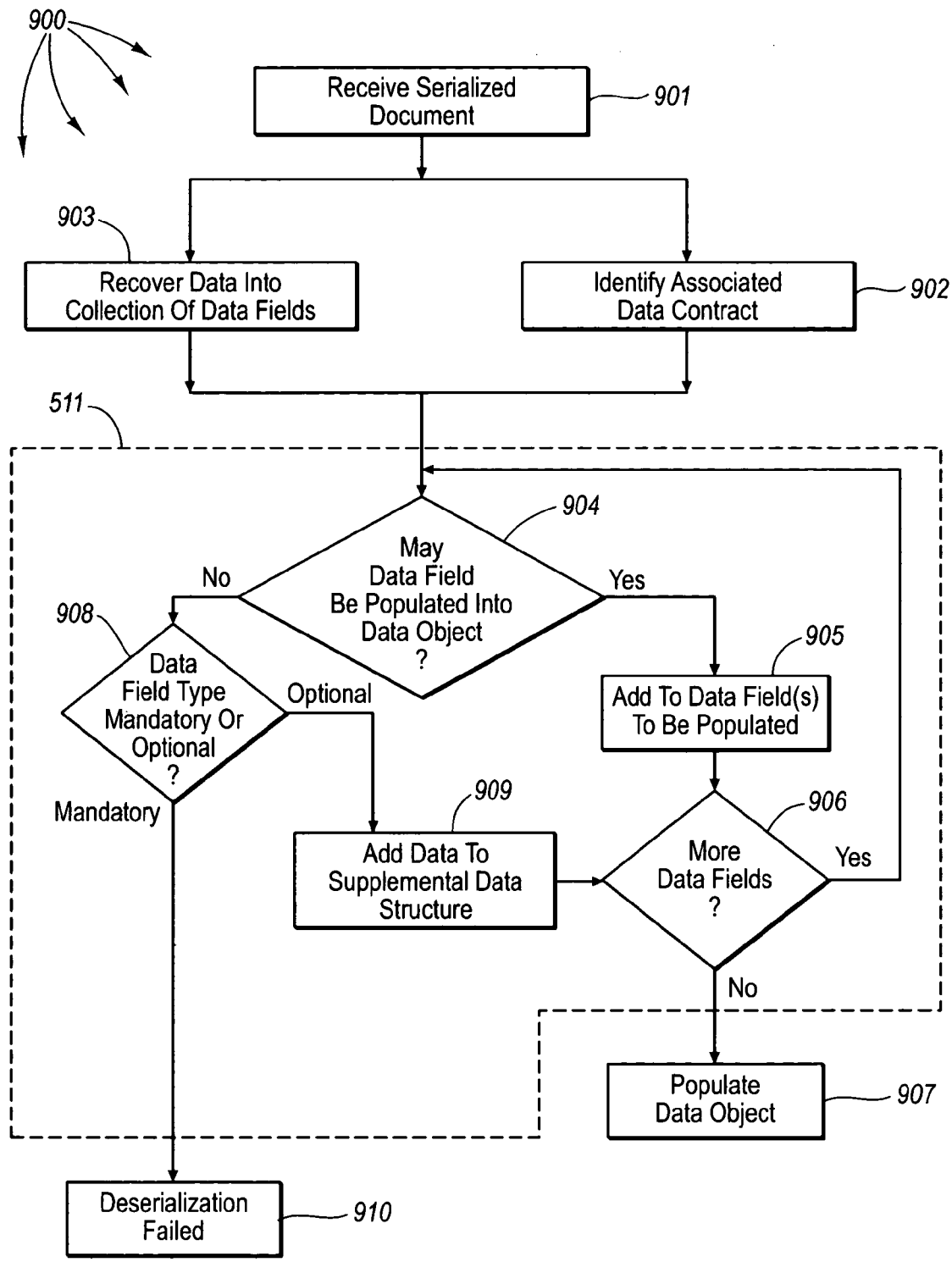
FIG. 9 illustrates a flowchart of a method of deserializing in accordance with the principles of the present invention.

FIG. 8 schematically illustrates a process of deserialization using a deserialization mechanism in accordance with the principles of the present invention. The deserialization mechanism 800 of FIG. 8 is similar to the serialization mechanism 600 of FIG. 6. The deserialization mechanism 800 also includes a deserialization engine 801, which may be similar to the serialization engine 601 of FIG. 6. A formatter 802 may be the same as the formatter 602 of FIG. 6. The formatter 802 may also have access to the converters library 612, whereas the deserialization engine 801 may also have access to the data contracts 611. The remainder of FIG. 8 will be described with respect to FIG. 9, which illustrates a flowchart of a method 900 of deserializing in accordance with the principles of the present invention.

First, the deserialization mechanism 800 (which is an example of the transfer mechanism 203 of FIG. 2) receives a serialized data structure having a serialization format (act 901). For example, the formatter 802 receives the serialized data 843, which is in a particular serialization format.

The deserialization mechanism 800 identifies a data contract associated with the serialized data structure (act 902). This identification may be performed by evaluating metadata associated with the serialized document. The identification may be rules based. For example, the rules may specify that serialized documents received from a particular sender, and which have a particular document name correspond to a particular data contract. These rules may be set by an administrator or may be hard-coded by the software developer, or set in some other way.

In addition, the deserialization mechanism recovers one or more data fields from the serialized data structure that are of the one or more data field types identified by the data contract (act 903). The formatter 802 may accomplish this by selecting an appropriate one of converters 612 that corresponds to the serialization format of the serialized data 843. The formatter 802 thus recovers abstract data 842.

For each extracted data field that corresponds to a data field type identified in the data contract, the deserialization engine determines whether the data field may be populated into the data object (decision block 904). This may be determined by the data populator 841. If the data field may be populated into the corresponding data object, (Yes in decision block 904), the data populator 841 adds this data field to a collection of data items to be populated into the data object (act 905), or alternatively immediately populates the data object with the data field. If there are no more data fields to be populated into the data object (No in decision block 906), then the data object is populated (act 907). Otherwise, (Yes in decision block 906), the next recovered data field is evaluated (decision block 904), where the process is repeated.

If at any time it is determined that a recovered data field may not be populated into the data object (No in decision block 904), then it is determine whether the data field is mandatory or optional (decision block 908). This may be determined by reviewing the corresponding data field type in the corresponding data contract. If a "must understand" flag "MU" is set, then the data field type must be understood by the data object and the data field is determined to be mandatory. If the must understand field is not set, then the data field type is optional on the receive end.

If the data field is optional (optional in decision block 908), then the data field is populated into a supplemental data structure (e.g., residual field 202E of FIG. 2) instead of into the data object. For example, the data populator 841 may provide the data field into the supplemental data structure 844. In one embodiment, act 909 is only performed if a round trip designator (RT) is set in the corresponding data field type of the data contract. In either case, the flow then proceeds to decision block 906, where it is determined if there are more data fields to be populated (decision block 906). If, on the other hand, the data field is mandatory (Mandatory in decision block 908), then the deserialization is indicated to have failed (act 910).

This process included within the dashed box 911 may be repeated for all recovered data fields until either there are no more data fields to evaluate (No in decision bloc 906), or until the deserialization fails (act 910). The process within dashed box 911 may also repeat for data field types for which there is no corresponding data field retrieved for the data object, although the nature of the flow would change slightly as will now be described. Specifically, the data field may not be populated into the data object (No in decision block 904) since the data field does not exist. If the data field type is optional (Optional in decision block 908), flow proceeds directly to decision block 906, where it is determined whether there are any more retrieved data fields to be evaluated or any more data field types for which there is no corresponding retrieved data field. If the data field type is mandatory (Mandatory in decision block 908), the deserialization fails (act 910).

The method 900 may be repeated for any received serialized document regardless of the format of the serialized document, and regardless of which data contract is associated with the serialized document.

Accordingly, the principles of the present invention provide a serialization mechanism in which the abstract data is extracted from the data object and serialized as opposed to serializing the entire data object. Similarly, a deserialization mechanism recovers the abstract data and populates the abstract data into the data object rather than deserializing the entire data object. Accordingly, the serialization and deserialization mechanism is compatible with multiple serialization formats and data object types, without having to expose the nature of the data object type that is processed in-memory.

Figure 10:
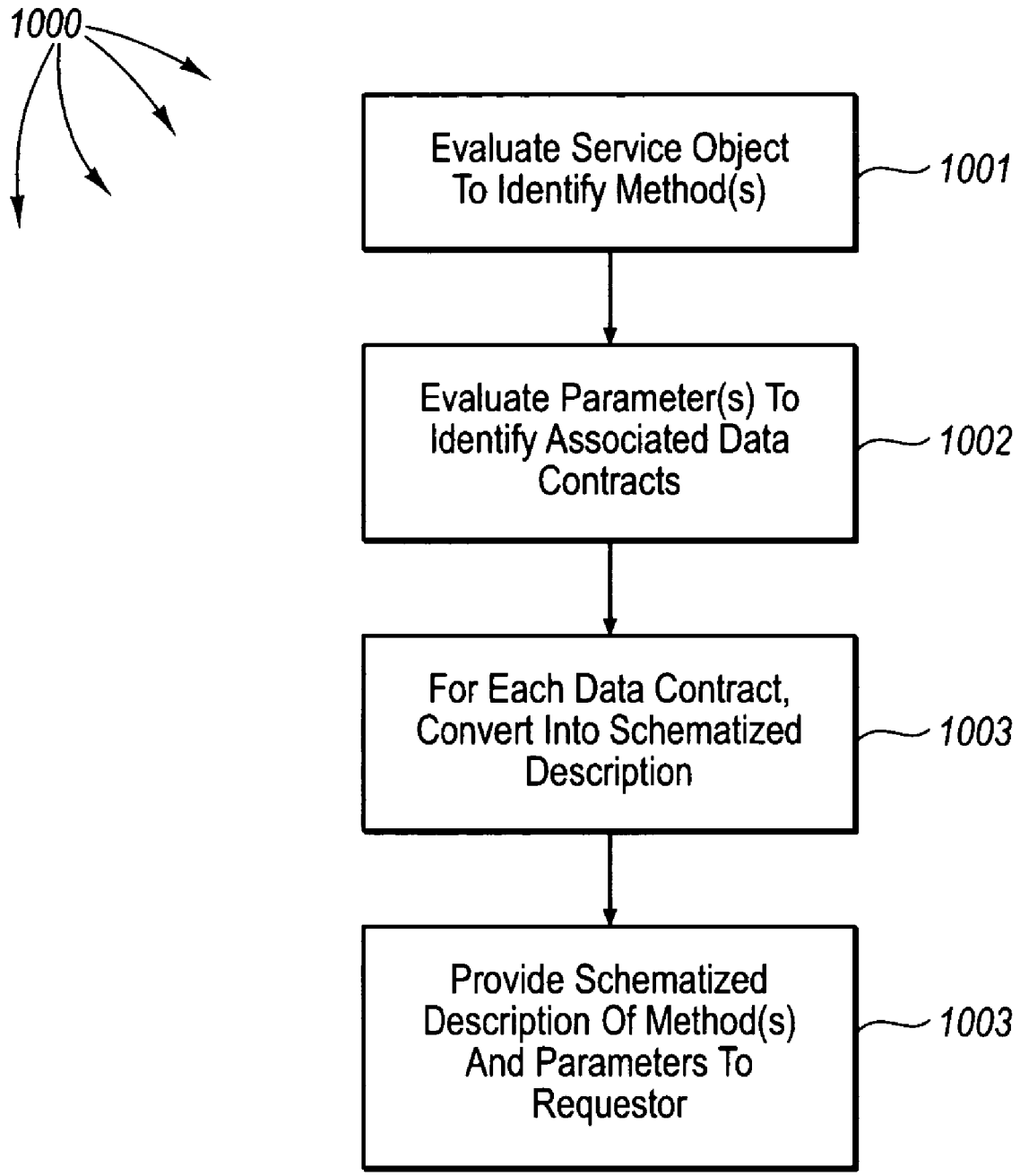
FIG. 10 illustrates a flowchart of a method for expressing capabilities of a service in accordance with the principles of the present invention.

FIG. 10 illustrates a flowchart of a method for expressing capabilities of a service in accordance with the principles of the present invention. This process may be performed before serialization and deserialization described above. The method 1000 may be performed upon receiving a request for an expression of the service's capabilities, although that is not required.

First, a service object is evaluated to identify one or more methods provided by the service object (act 1001). This service object may be, for example, the entire web service. The parameters of the method(s) are then evaluated to determine which have data contracts associated therewith (act 1002). For each data contract, the data contract is then converted into a schematized description of the parameter (act 1003). For example, the serialization mechanism 600 may be configured to generate an XML Schema Description (XSD) document for each parameter based on the associated data contract. The service may then provide a schematized description of the methods (e.g., in the form of a Web Services Description Language (WSDL)) along with an associated schematized description of the parameters accepted (e.g., in the form of an XSD document for each parameter).

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes, which come within the meaning and range of equivalency of the claims, are to be embraced within their scope.

What is claimed and desired secured by United States Letters Patent is:

1. A computerized method for transferring data over a network from a source data structure on a source computing system to a target data structure on a target computing system, the method comprising the following:

an act of accessing said source data structure, wherein the source data structure comprises a plurality of data fields;

an act of copying over the network at least one data field of the plurality of data fields that is common to both the source data structure and the target data structure from the source data structure to the target data structure;

for a given field corresponding to the target data structure, an act of determining that the given field does not have an associated field in the source data structure, and in response, performing the following:

an act of determining whether or not it is mandatory that the source data structure supply a field corresponding to the given field in order for the transfer to be successful;

if it is mandatory that the source data structure supply a field corresponding to the given field, an act of failing the transfer; and if it is not mandatory that the source data structure supply a field corresponding to the given field, an act of continuing with the transfer;

for a given field of the source data structure, an act of determining that there is no corresponding field in the target data structure, and in response, performing the following:

an act of determining whether or not it is mandatory that the target data structure have a field corresponding to the given field in the source data structure in order for the transfer to be successful;

if it is mandatory that the target data structure have a field corresponding to the given field in the source data structure, an act of failing the transfer; and if it is not mandatory that the target data structure have a field corresponding to the given field in the source data structure, an act of providing the data from the other field of the first data structure into a residual field of the second data structure.

2. A computerized method for transferring data from a source data structure to a target data structure in accordance with claim 1, wherein the target data structure is present on a target data structure, wherein the computerized method is performed on the target computing system.

3. A computerized method for transferring data from a source data structure to a target data structure in accordance with claim 1, wherein the source data structure is read by a computing system from a data store, and the target data structure is represented in memory on the computing system.

4. A computerized method for transferring data from a source data structure to a target data structure in accordance with claim 1, wherein the target data structure is a form template.

5. A computerized method for transferring data from a source data structure to a target data structure in accordance with claim 1, wherein the given field corresponding to the target data structure represents whether or not the given field must be supplied by the source computing system in order for the transfer to be successful.

6. A computerized method for transferring data from a source data structure to a target data structure in accordance with claim 1, wherein the given field of the source data structure specifies whether or not it is mandatory that the target data structure have a field corresponding to the given field in the source data structure in order for the transfer to be successful.

7. A computerized method for transferring data from a source data structure to a target data structure in accordance with claim 1, wherein it is determined that it is mandatory that the source data structure supply a field corresponding to the given field in order for the transfer to be successful.

8. A computer program product comprising one or more computer-readable storage media having computer-readable instructions encoded thereon that, when executed by one or more processors of a computing system, cause the computing system to perform a method for transferring data from a source data structure to a target data structure, the method comprising the following:

an act of accessing said source data structure, wherein the source data structure comprises a plurality of data fields;

an act of copying at least one data field of the plurality of data fields that is common to both the source data structure and the target data structure from the source data structure to the target data structure;

for a given field corresponding to the target data structure, an act of determining that the given field does not have an associated field in the source data structure, and in response, performing the following:

an act of determining whether or not it is mandatory that the source data structure supply a field corresponding to the given field in order for the transfer to be successful;

if it is mandatory that the source data structure supply a field corresponding to the given field, an act of failing the transfer; and if it is not mandatory that the source data structure supply a field corresponding to the given field, an act of continuing with the transfer;

for a given field of the source data structure, an act of determining that there is no corresponding field in the target data structure, and in response, performing the following:

an act of determining whether or not it is mandatory that the target data structure have a field corresponding to the given field in the source data structure in order for the transfer to be successful;

if it is mandatory that the target data structure have a field corresponding to the given field in the source data structure, an act of failing the transfer; and if it is not mandatory that the target data structure have a field corresponding to the given field in the source data structure, an act of providing the data from the other field of the first data structure into a residual field of the second data structure.

9. A computer program product in accordance with claim 8, wherein the target data structure is present on a target data structure, wherein the computerized method is performed on the target computing system.

10. A computer program product in accordance with claim 8, wherein the source data structure is read by a computing system from a data store, and the target data structure is represented in memory on the computing system.

11. A computer program product in accordance with claim 8, wherein the target data structure is a form template.

12. A computer program product in accordance with claim 8, wherein the given field corresponding to the target data structure represents whether or not the given field must be supplied by the source computing system in order for the transfer to be successful.

13. A computer program product in accordance with claim 8, wherein the given field of the source data structure specifies whether or not it is mandatory that the target data structure have a field corresponding to the given field in the source data structure in order for the transfer to be successful.

14. A computer program product in accordance with claim 8, wherein it is determined that it is mandatory that the source data structure supply a field corresponding to the given field in order for the transfer to be successful.

* * * * *